(12) United States Patent
Murray

(10) Patent No.: US 9,346,346 B2
(45) Date of Patent: May 24, 2016

(54) CHASSIS FOR ELECTRIC VEHICLE

(75) Inventor: Ian Gordon Murray, Puttenham (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 163 days.

(21) Appl. No.: 13/811,346

(22) PCT Filed: Jul. 22, 2011

(86) PCT No.: PCT/GB2011/001105
§ 371 (c)(1),
(2), (4) Date: Jan. 21, 2013

(87) PCT Pub. No.: WO2012/010850
PCT Pub. Date: Jan. 26, 2012

(65) Prior Publication Data
US 2013/0175104 A1    Jul. 11, 2013

(30) Foreign Application Priority Data

Jul. 22, 2010  (GB) .................................. 1012332.1

(51) Int. Cl.
*B60K 1/04*  (2006.01)
*B62D 25/20*  (2006.01)
*B62D 29/04*  (2006.01)

(52) U.S. Cl.
CPC . *B60K 1/04* (2013.01); *B62D 25/20* (2013.01); *B62D 29/041* (2013.01)

(58) Field of Classification Search
CPC ......................................... B32B 15/08–15/098
See application file for complete search history.

(56) References Cited

U.S. PATENT DOCUMENTS

| | | |
|---|---|---|
| 5,392,873 A | 2/1995 | Masuyama et al. |
| 5,704,644 A | 1/1998 | Jaggi |
| 5,918,692 A | 7/1999 | Sekita |
| 6,040,080 A | 3/2000 | Minami |

(Continued)

FOREIGN PATENT DOCUMENTS

EP    2083469 A1    7/2009

(Continued)

OTHER PUBLICATIONS

International Search Report and Written Opinion; PCT/GB2011/001105; Nov. 24, 2011.

(Continued)

*Primary Examiner* — J. Allen Shriver, II
*Assistant Examiner* — Erez Gurari
(74) *Attorney, Agent, or Firm* — Westman, Champlin & Koehler, P.A.; Z. Peter Sawicki; Amanda M. Prose

(57) ABSTRACT

Electric vehicles usually inherit a chassis of a pressed steel construction from a conventional vehicle design. This imposes a substantial weight penalty on the vehicle. We disclose a chassis element for a vehicle, formed of an outer skin material, an inner core material enveloped by the outer skin material, and at least one array of aligned fibres, and comprising a restraint for an electrical battery adapted to locate the battery over the at least one array. There can be multiple arrays of aligned fibres, preferably disposed at a transverse angle relative to each other of less than 90°. We particularly prefer three arrays of aligned fibres, which can be disposed relative to each other at an angle of 60°. The fibres can be disposed within the skin material. The restraint ideally comprises an upstanding wall which will serve to confine the batteries in the event of a collision or other sudden movement, but will allow them to be replaced easily for maintenance purposes or to replace an exhausted set of batteries with a charged set. Alternatively, the restraint can comprise an attachment point for the battery. The core material is preferably less dense than the skin material, thereby allowing the composite element to have a light weight and a high rigidity. The application also relates to a vehicle comprising a chassis, an electric motor, a chassis element as set out above, and electrical connections from the battery to the motor, wherein the chassis element is attached to the chassis via removable fixings extending through the fixing points of the chassis element into corresponding fixing points on the chassis.

12 Claims, 4 Drawing Sheets

(56) References Cited

U.S. PATENT DOCUMENTS

2008/0160394 A1 7/2008 Takasaki
2009/0186266 A1 7/2009 Nishino et al.

FOREIGN PATENT DOCUMENTS

| GB | 2072308 | A2 | 6/2009 |
| JP | 10138956 | A | 5/1998 |
| JP | 2006182295 | A | 7/2006 |
| WO | 2009122178 | A1 | 10/2009 |

OTHER PUBLICATIONS

GB Search Report; GB1012332.1; Oct. 21, 2010.

European Examination Report for EP11746277.0, mailed Jul. 9, 2014.

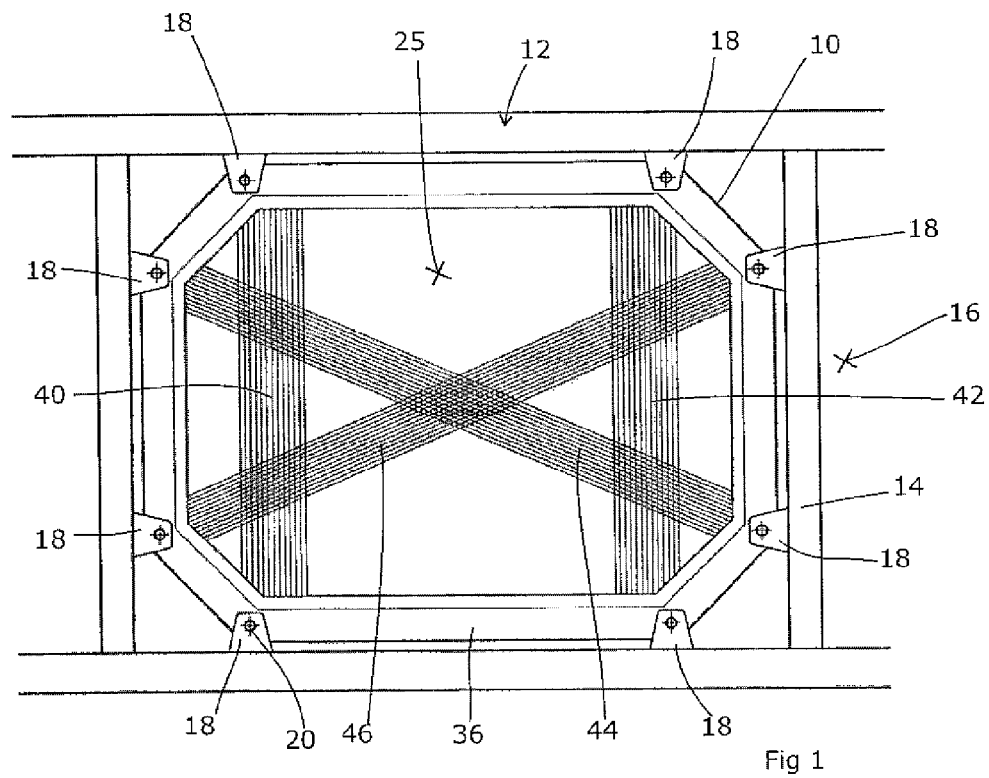
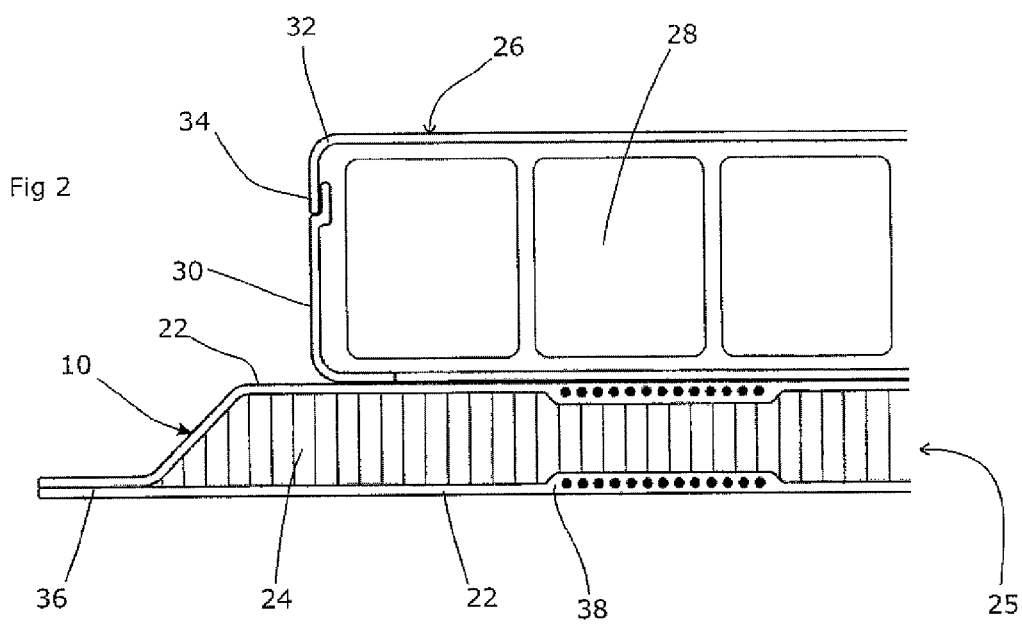

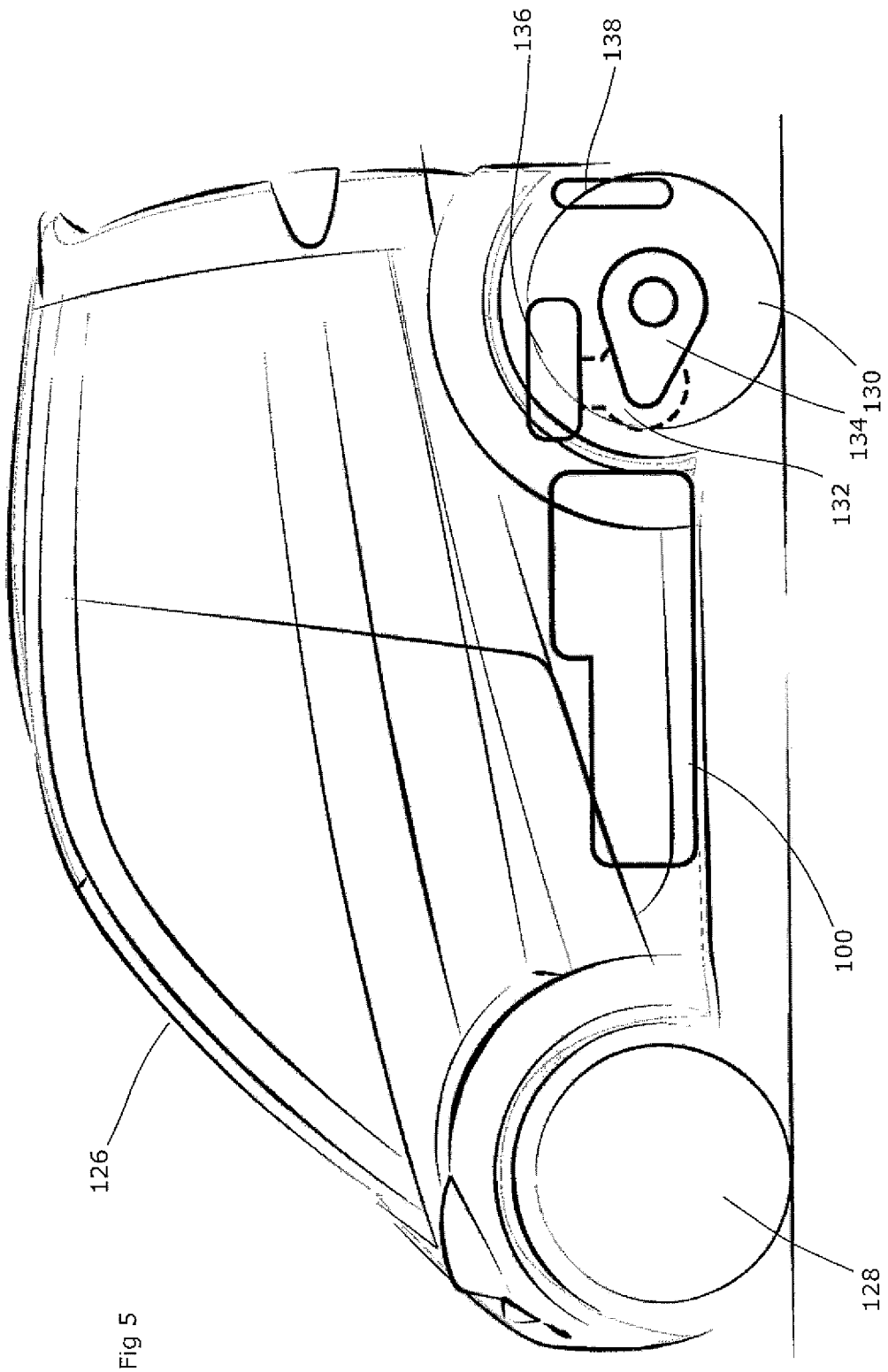

CHASSIS FOR ELECTRIC VEHICLE

CROSS-REFERENCE TO RELATED APPLICATION

This Application is a Section 371 National Stage Application of International Application No. PCT/GB2011/001105, filed Jul. 22, 2011 and published as WO/2012/010850 on Jan. 26, 2012, in English, which claims priority to GB Application No. 1012332.1, filed Jul. 22, 2010, the contents of which are hereby incorporated by reference in their entirety.

FIELD OF THE INVENTION

The present invention relates to electric vehicles.

BACKGROUND ART

Most electric vehicles are based around designs used for internal-combustion-powered vehicles, with modifications as necessary to replace the internal combustion engine with an electric motor and to store the necessary batteries at a suitable location within the vehicle. This has the effect that the chassis of the original vehicle is inherited by the electric vehicle, with little adaptation to take account of the substantial weight of the batteries and little thought given as to how they might be removed and replaced in future. Generally, batteries gradually lose capacity as they are cyclically charged and discharged and do eventually need to be replaced.

As examples, in the BMW Mini 'E' vehicle, the electric motor is located in conventional location in the front engine bay and the batteries take the place of the rear seats and part of the rear loadspace, leading to a design that is able to accommodate only two people despite having a relatively large bodyshell. The Toyota Prius hybrid integrates the batteries into the vehicle more effectively, with the result that their replacement is regarded by some as not economically viable, implying a service life for the vehicle of only 150,000 km (approx 100,000 miles). Only a few vehicles have been designed ab initio around the needs of electrical propulsion, such as the Mercedes A-class which includes a double-floored chassis that provides space beneath the passenger cabin in which batteries can be placed.

This approach hampers the design of electric vehicles. The inherited chassis is usually of a pressed steel construction, which carries a substantial weight penalty. This, in turn, means that more powerful batteries are needed in order to propel the vehicle, increasing the weight of the vehicle still further; each cell is typically 6 kg, and many cells will be needed for a viable vehicle. However, a strong crash-resistant chassis or other form of restraint for the batteries is essential in order to restrain them during an impact. Often, the batteries are located behind the passengers and would therefore inflict serious injuries if unrestrained during a frontal collision. Such an enclosure or restraint is usually of steel or other similar construction, adding still further weight. Designing this in a way that allows for easy replacement of the batteries will add further complexity and weight.

SUMMARY OF THE INVENTION

The present invention therefore provides a chassis element for a vehicle, formed of an outer skin material, an inner core material enveloped by the outer skin material, and at least one array of aligned fibres, and comprising an enclosure for an electrical battery and a plurality of fixing points for attaching the element to a chassis.

The aligned fibres can extend from one fixing point to another fixing point, allowing load transfer within the combined structure that is the chassis element and the remainder of the chassis. This enables the battery casing to form part of the loadbearing structure of the chassis, reducing the overall weight of the vehicle and improving its performance. At the same time, making the battery case part of the chassis allows it to be made accessible; the vehicle's chassis element can (for example) be accessed from beneath the vehicle, released from the remainder of the chassis and lowered out of the vehicle. It can then be replaced with a unit carrying fresh batteries, or opened to allow replacement of the batteries within it.

In this way, the invention allows the design of a removable section of the chassis that, when fitted, forms an integral part of the loadbearing design of the chassis, but which can be removed straightforwardly to allow for replacement of the batteries. Compared to the existing approach of simply placing the batteries somewhere within a complete chassis, significant weight can be saved and access to the batteries can be significantly improved.

There can be multiple arrays of aligned fibres, preferably disposed at a transverse angle relative to each other of less than 90°. Three arrays of aligned fibres are preferred, which can be disposed relative to each other at an angle of 60°. The fibres can be disposed within the skin material.

The restraint ideally comprises an upstanding wall which will serve to confine the batteries in the event of a collision or other sudden movement, but will allow them to be replaced easily for maintenance purposes or to replace an exhausted set of batteries with a charged set. Alternatively, the restraint can comprise an attachment point for the battery.

The core material is preferably less dense than the skin material, thereby allowing the composite element to have a light weight and a high rigidity.

In an embodiment, one part of the outer skin material extends in a planar manner from one fixing point to another. For example, where the outer skin material has first and second parts on either side of the inner core material, the first part may extend in a planar manner between the plurality of fixing points. The flat part of the skin lends the sheet a high degree of rigidity and allows it to bear loads once connected as part of a chassis. It also lends the chassis an improved aerodynamic drag than might otherwise be the case.

In another aspect, the invention provides a vehicle comprising a chassis, an electric motor, a chassis element as defined above, and electrical connections from the battery to the motor, wherein the chassis element is attached to the chassis via removable fixings extending through the fixing points of the chassis element into corresponding fixing points on the chassis

BRIEF DESCRIPTION OF THE DRAWINGS

An embodiment of the present invention will now be described by way of example, with reference to the accompanying figures in which;

FIG. 1 shows a plan view of a battery mounting plate according to a first embodiment of the present invention, in place within a vehicle chassis;

FIG. 2 shows a vertical sectional view through the battery enclosure of the first embodiment of the present invention;

FIG. 5 shows a schematic view from one side of the vehicle.

DETAILED DESCRIPTION OF THE EMBODIMENTS

Figure 3:
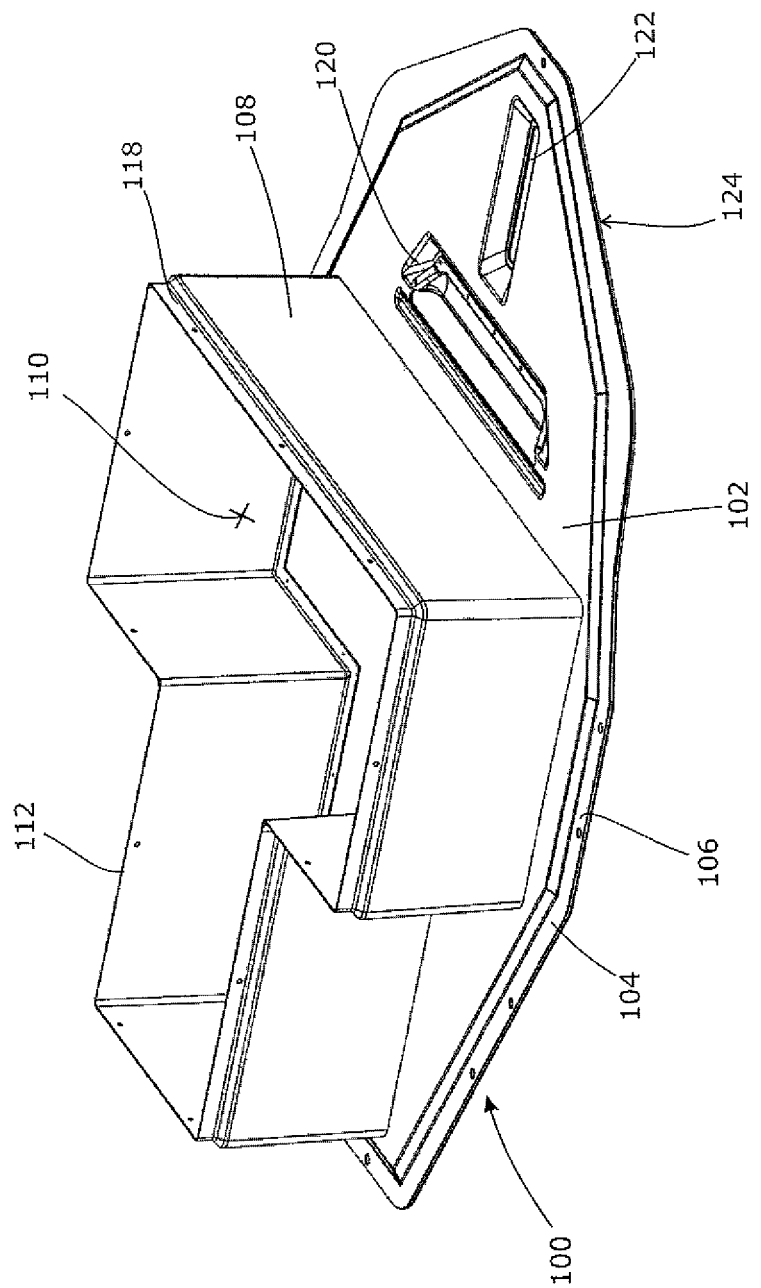
FIG. 3 shows a perspective view of a battery enclosure according to a second embodiment of the present invention, in an open state.

FIG. 1 shows the chassis element 10 of the present invention, fitted into a chassis structure 12. The chassis structure as described in our earlier applications WO2009/122178 and PCT/GB2010/001253, the contents of which are hereby incorporated by reference and to which the skilled reader is referred for a fuller understanding of the present invention. The chassis thus comprises a tubular steel frame 14 onto which is bonded a non-planar composite sheet 16. Mechanical loads are transferred via the steel frame and the composite sheet acting as a single structure. The sheet may include directional fibres in order to improve the crashworthiness of the structure as a whole in specific orientations.

According to this invention, the chassis 12 is provided with a plurality of attachment points 18. In this case, they are in the form of steel tab sections welded to the steel frame 14 and provided with through-holes 20. The chassis element 10 takes the form more clearly shown in FIG. 2, with an outer skin 22 enclosing an inner core 24 to form a strong and rigid sheet 25 that is nevertheless lightweight. A battery casing 26 can be affixed to the sheet 25, formed of the outer skin material and enclosing a plurality of battery cells 28. To allow access, the casing 26 is formed of a lower tray section 30 that is adhesively attached to the skin 22 and an upper lid section 32 which fits onto the tray section 30 via an interlocking arrangement 34. Other forms of attachment such as bolts, screws and the like may be used instead.

At the outer extremities of the sheet 25, the skin 22 overlaps the inner core 24 on each side, allowing a thin outer flange 36 to be defined around the edge of the sheet 25 by bringing the skin from each opposing side of the sheet 25 together and bonding it adhesively (or otherwise). This allows fixing points to be defined on the flange 36, by creating through-holes through the flange 36. A bolt can then be passed through the through-holes 20 of the tabs 18 on the chassis 12, through the flange 36, and secured with appropriate nuts, washers and the like. A plurality of such through-holes spaced around the flange 36 to correspond to the locations of the tabs 18 and through-holes 20 will allow the chassis element 10 to be securely held in place within the chassis 12.

It can be seen from FIG. 2 that the skin 22 is flat, i.e. planar, on one side of the core material 24 (in the illustrated embodiment the lower side of the core material), and extends in a planar manner from one through-hole 20 to another. The flat part of the skin 22 lends the sheet 25 a high degree of rigidity and allows it to bear loads once connected as part of a chassis (for example as described below).

The sheet 25 also comprises a series of directional-fibre reinforcements 38. As illustrated in FIG. 2, these are formed in the sheet 25, bonded to opposing inner faces of the skin 22. Each comprises a mat of aligned fibres such as carbon, Kevlar, glass or other stiff fibre-reinforcement material and provides additional rigidity to the sheet in the direction of the fibres.

As shown in FIG. 1, the sheet 25 has a total of eight fixing points. Along each lateral side there are two fixing points, spaced longitudinally along the edge of the sheet 25. One directional fibre reinforcement 40 extends laterally across the sheet 25 between one of these pairs of fixing points. A second directional fibre reinforcement 42 extends laterally across the sheet 25 between the other of these pairs of fixing points, spaced longitudinally from the first.

The other four fixing points are arranged in a spaced pair at the front of the sheet 25 and a spaced pair at the rear of the sheet 25. A third directional fibre reinforcement 44 extends diagonally across the sheet 25 from a front fixing to the diametrically opposite rear fixing via the centre of the sheet 25. A fourth directional fibre reinforcement 46 extends diagonally across the sheet 25 from the other front fixing to the other rear fixing, again via the centre of the sheet 25 where it crosses the third directional fibre reinforcement 44.

The directional fibre reinforcements extend into the flange region 36 at each of their end sections, and thus surround the fixing points defined in the flange 36. As the directional fibre reinforcements 40, 42, 44 and 46 all therefore extend from one fixing to another, they are all able to contribute to the overall rigidity of the chassis 12 in which the chassis element 10 is fitted. Forces can be transmitted from the chassis 12 into the directional fibre reinforcements 40, 42, 44 and 46 via the fixing points.

This has two advantages; first, the chassis as a whole can be lightened (or made more rigid) since the battery casing structure described above will contribute to the overall performance of the chassis. Second, as there is no need for additional chassis structure around the battery casing, it can be located at an outer extremity of the chassis (such as the underside) where access can be easily gained for removal and replacement of the batteries.

FIG. 3 shows an example of the invention as applied to a specific vehicle. In this case, the vehicle concerned has the chassis of the type shown in our earlier applications WO2009/122178 and PCT/GB2010/001253, which essentially comprises a tubular steel frame to which one or more composite sheets are bonded. Those composite sheets assist in transferring forces between the steel frame members and thus contribute to the overall rigidity of the chassis.

In the example shown in FIG. 3, the rearmost composite sheet has been removed and is replaced with the sheet 100 illustrated. This is designed around the intended three-seat layout of the vehicle, as discussed in the above-referenced applications and in WO2008/110814. The sheet 100 therefore includes a substantially flat base 102 shaped to fit within the steel frame members of the chassis and with an internal structure as described above, i.e. an outer skin around a lightweight core with directional-fibre reinforcement. An outer flange 104 allows the sheet 100 to be supported on the steel frame and has through-holes 106 to allow it to be attached to the frame via bolts (or the like) so that it can later be released when the batteries are due for replacement. As noted above, the directional fibres within the base 102 extend from around one through-hole to another, thereby allowing the transfer of forces within the chassis via the sheet 100.

An upstand 108 extends upwardly from the base 102 to define an enclosed space 110. A plurality of cells can be placed within the upstand 108, where they will be retained. Ideally, the upstand 108 is designed so that the cells will be a suitably snug fit within, leaving only essential ventilation space around them and preventing significant movement of the cells. Additional retaining arrangements can be provided such as straps, spacers and the like.

In this example, the upstand 108 is also designed to fit within the available space under the three-seat configuration. Thus, there is a narrow region 112 of the upstand 108 which fits beneath the central driving position, and a wider region 114 immediately behind which fits beneath the rear passenger seats.

Figure 4:
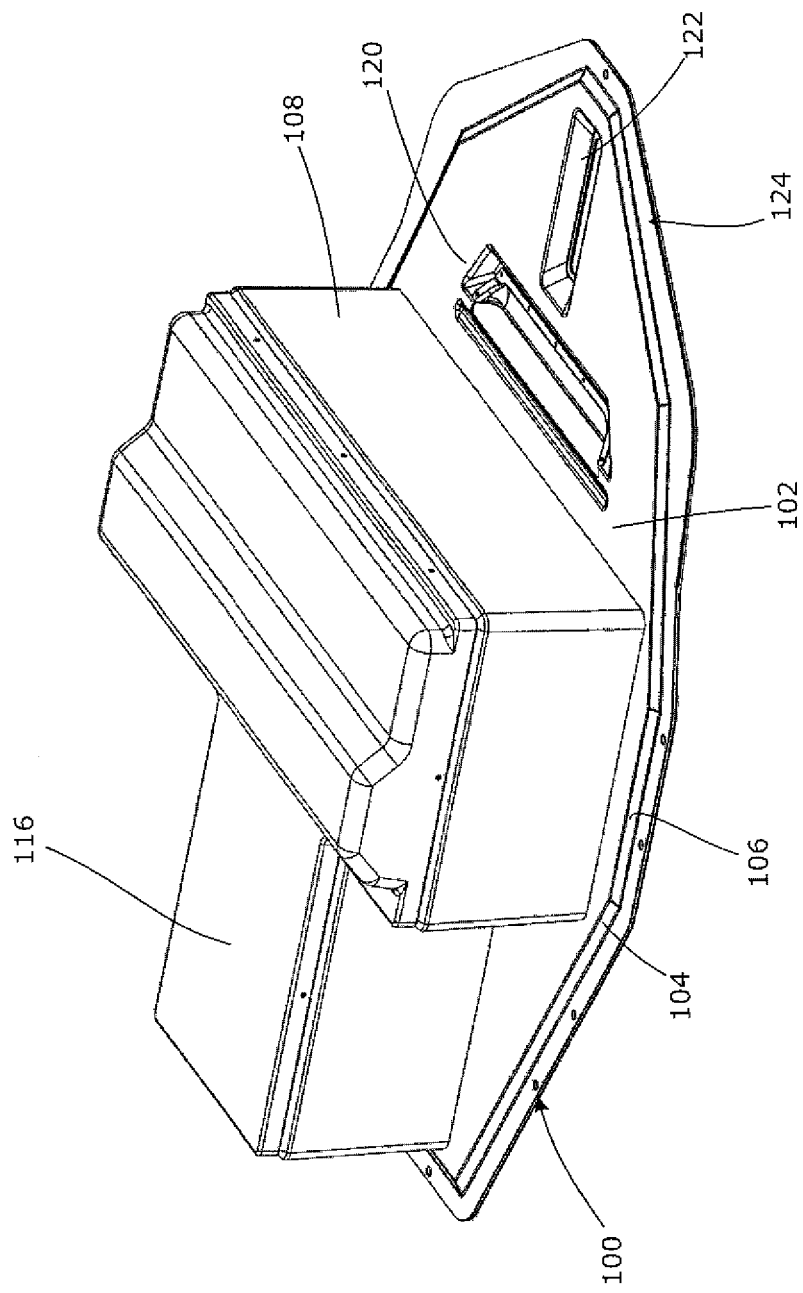
FIG. 4 shows the battery enclosure of the second embodiment, closed.

As shown in FIG. 4, a closure 116 fits over the upstand 108. Formations 118 on the outer upper extremity of the upstand 108 engage with corresponding formations on the inner lower extremity of the closure 116 to retain the closure 116 in place once fitted. Apertures (not shown) can be provided in the upstand 108 or in the closure 116 to allow essential cabling to and from the batteries for the transmission of electrical power and signalling. As the structural rigidity of the sheet 100 is provided by the base 102, such apertures will not affect the chassis integrity.

A pair of ventilation slots 120, 122 in the base 102 allow for cooling air to be directed past an electric motor sited at the rear of the vehicle. As these slots are formed in the base 102, the directional fibre reinforcement will need to be designed around these in order to retain the necessary rigidity in the base 102.

FIG. 5 shows the general location of the batteries within the vehicle 126. It will be appreciated that FIG. 5 is a schematic illustration only and is not geometrically or dimensionally precise. Thus, the exact shape of the battery casing in FIG. 5 does not correspond to the exact shape of the sheet 100 of FIGS. 3 and 4. However, it offers a general understanding. Thus, the sheet 100 including the batteries (referred to hereafter as the battery case 100) sits at the base of the vehicle behind the front wheels 128, ahead of the rear wheels 130, and beneath the passenger cell. An electric motor 132 and gearbox 134 drive the rear wheels, and are supplied with power from the battery case 100 via a control unit 136. A radiator/heat-exchanger 138 allows for cooling of various systems, using air flowing through the vents 120, 122 (FIG. 3), past the motor 132, gearbox 134 and control unit 136 and then out via the radiator/heat-exchanger 138.

The battery case 100 can be removed from the remainder of the vehicle 126 by raising the vehicle 126 on a suitable lift, supporting the battery case 100 with a jack, and releasing the fixings that secure the battery case 100 to the chassis at its outer flange 104. The jack can then be lowered, bringing the battery case 100 down and out of the vehicle 126. The battery case 100 is shaped so that it does not interfere with other parts of the vehicle 126; its rearmost section 124 is tapered so as to avoid the rear suspension, for example.

Thus, the invention permits the batteries of an electric vehicle to be stored in a manner that is safe but which is also easily accessible for renewal and/or replacement, whilst minimising the total weight of the chassis.

Also, the high voltage (400V) elements of the powertrain, including battery pack 100, motor 132, control unit 136 and gearbox 134 are all contained in a compact secure arrangement providing superior crash worthiness over other schemes carried over from donor internal combustion-powered bodied vehicles, where battery, control units and motors may be distributed all over the vehicle, increasing the dangers of 400V systems being exposed posing a post-crash risk to occupants or rescue services.

It will of course be understood that many variations may be made to the above-described embodiment without departing from the scope of the present invention. For example, the specific dimensions and shapes of the various elements of the invention are dependent on the design of the chassis into which those elements are intended to fit, and the size and number of cells which will be used.

The invention claimed is:

1. A chassis element for a vehicle, formed of an outer skin material, an inner core material enveloped by the outer skin material, and at least one array of aligned fibres, and comprising;
   an enclosure for an electrical battery; and
   a plurality of fixing points provided around the edge of the sheet for removably attaching the element to a chassis.

2. The chassis element according to claim 1 in which the aligned fibres extend from one fixing point to another fixing point.

3. The chassis element according to claim 1 in which there are multiple arrays of aligned fibres.

4. The chassis element according to claim 3 in which the arrays of aligned fibres are disposed relative to each other at a transverse angle.

5. The chassis element according to claim 4 in which the angle is less than 90 degrees.

6. The chassis element according to claim 3 in which there are 3 arrays of aligned fibres.

7. The chassis element according to claim 6 in which the 3 arrays of aligned fibres are disposed relative to each other at an angle of 60°.

8. The chassis element according to claim 1 in which the fibres are disposed within the skin.

9. The chassis element according to claim 1 in which the core is less dense than the skin.

10. The chassis element according to claim 1, wherein part of the outer skin material is planar as between the plurality of fixing points.

11. The chassis element according to claim 10, wherein the outer skin material comprises first and second portions on either side of the inner core material, and wherein the first portion is planar as between the plurality of fixing points.

12. The vehicle comprising a chassis, an electric motor, a chassis element according to claim 1, and electrical connections from the battery to the motor, wherein the chassis element is attached to the chassis via removable fixings extending through the fixing points of the chassis element into corresponding fixing points on the chassis.

* * * * *